United States Patent [19]

Peterson

[11] 4,207,868

[45] Jun. 17, 1980

[54] SOLAR ENERGY SYSTEM

[76] Inventor: Roger A. Peterson, 1088-25th Ave. S.E., Minneapolis, Minn. 55414

[21] Appl. No.: 881,703

[22] Filed: Feb. 27, 1978

[51] Int. Cl.² .................................................. F24J 3/02
[52] U.S. Cl. .................................... 126/449; 126/430; 126/436; 165/48 S
[58] Field of Search ............... 126/270, 271, 428, 429, 126/430, 436, 449, 450; 237/1 A; 165/170, 48 S

[56] References Cited

U.S. PATENT DOCUMENTS

| | | | |
|---|---|---|---|
| 2,671,441 | 3/1954 | Harris | 126/270 |
| 3,412,728 | 11/1968 | Thomason | 126/270 |
| 3,863,621 | 2/1975 | Schoenfelder | 126/270 |
| 4,006,856 | 2/1977 | Nilsson | 237/1 A |
| 4,016,861 | 4/1977 | Taylor | 126/270 |
| 4,019,494 | 4/1977 | Sofdari | 126/270 |
| 4,024,910 | 5/1977 | Werner | 165/45 |
| 4,034,736 | 7/1977 | Telkes | 126/270 |
| 4,041,591 | 8/1977 | Noll et al. | 138/38 |
| 4,051,891 | 10/1977 | Harrison | 165/54 |
| 4,051,999 | 10/1977 | Granger et al. | 237/1 A |
| 4,054,246 | 10/1977 | Johnson | 237/1 A |
| 4,061,267 | 12/1977 | Löf | 237/1 A |
| 4,062,347 | 12/1977 | Jensen | 126/270 |
| 4,066,118 | 1/1978 | Goettl | 165/18 |
| 4,068,652 | 1/1978 | Worthington | 126/270 |
| 4,073,282 | 2/1978 | Schriefer, Jr. | 126/270 |
| 4,073,283 | 2/1978 | Löf | 126/270 |
| 4,076,013 | 2/1978 | Bette | 126/270 |
| 4,086,908 | 5/1978 | Werner et al. | 126/270 |
| 4,089,142 | 5/1978 | Kachadorian | 52/169.11 |
| 4,090,494 | 5/1978 | Borst et al. | 126/270 |
| 4,090,497 | 5/1978 | Kelly | 126/271 |
| 4,092,978 | 6/1978 | Levine | 165/146 |
| 4,126,270 | 11/1978 | Hummel | 126/270 X |
| 4,153,037 | 5/1979 | Isaacson | 126/449 |

OTHER PUBLICATIONS

A. J. Hand, Home Energy, 1978, "Materials for Solor Collectors" pp. 107-109.
"Heat From the Sun" brochure, Al Lebens.
Origin, Inc. Box SR9, Jackson, Wyoming 83001, "A Perforated Sheet Heat Transfer Surface with Particular Application to Solar Heating", Sep. 16, 1975.
D. J. Close, "Rock Pile Thermal Storage for Comfort Air Conditioning", Mechanical and Chemical Engineering Transactions, May 1965.
The Solar Home Book, pp. 166-170.
*The 1977 Sun Catalog*, "Solar Usage Now", P.O. Box 306 Bascom, Ohio 44809, pp. 8 and 19.
1974 Applications Handbook, Chapter 59, p. 59.12
*National Science Foundation*, "Proceedings of the Solar Heating and Cooling for Buildings Workshop", Jul. 1973, pp. 15 and 16.
*DIY-SOL, Inc.*, Marlboro, Massachusetts 01752, publication.
Park Energy Company, Star Route, Box 9, Jackson, Wyoming, Bulletin 37714.
*Solar Heating*, p. 274.
National Hardware Co. Box 975, Willmar, Minnesota 56201, Technical Data Sheet, "Air Type Solar Collectors."
National Energy Corporation 21716 Kenrick Avenue, Lakeville, Minnesota 55044, "Solar Energy Systems" brochure.

*Primary Examiner*—James C. Yeung
*Assistant Examiner*—Larry Jones
*Attorney, Agent, or Firm*—Burd, Bartz & Gutenkauf

[57] ABSTRACT

A solar heating system for space air heating of a building has a solar energy collector in air flow communication with underground heat storage structure. The collector has an elongated frame defining a plurality of air passages. A plurality of solar energy absorption panels are arranged in ascending space elevations in each air passage so that the air flowing through the passage transpires from the front to the rear of the panels over the length of the passage. Transparent sheet members, as glass, are mounted on the frame to cover the air passages. The heat storage structure has a plurality of concrete blocks having aligned air passages. The concrete blocks are covered with coarse rock. A pebble rock bed covers the coarse rock so that the entire heat storage structure has a large heat storing capacity. Heat insulated side walls surround the heat storage structure.

29 Claims, 20 Drawing Figures

SOLAR ENERGY SYSTEM

SUMMARY OF THE INVENTION

The invention is directed to a solar energy system that has solar energy collectors operable to heat air in elongated confined passages and transfer the heated air to a heat storage means. The solar energy system is used in association with a structure having an upper portion for supporting the collectors. The structure is located over an underground area used to accommodate the heat storage means. Manifolds and duct work connect the collectors with the heat storage means. A first air moving means is used to move the air in a circuit to and from the collectors and heat storage means. A second air moving means is used to withdraw heated air from the heat storage means in accordance with the heat requirements of an enclosed environment, such as a home, office, or other suitable environments.

The collector has frame means defining air passages in communication with an inlet and an outlet. Transparent means, such as glass or plastic panes, are mounted on the frame means to cover the passages. Solar energy absorption means are located in the passages for heating the air as it moves through the air passages. The solar energy absorption means includes a plurality of end to end sheet members located in an ascending stepped relationship in each of the air passages. Opposite edges of the sheet members are supported on the frame means. Each sheet member has a plurality of openings to allow air to transpire through the sheet members and efficiently pick up the heat from the sheet members. The hot air is pumped by the first air moving means to the heat storage means located under the structure.

The heat storage means has a capacity to store substantial amounts of heat energy over an extended period of time. The heat storage means includes concrete blocks provided with passages for accommodating the hot air. The blocks are positioned side-by-side with the passages of adjacent blocks aligned with each other. A coarse rock bed covers the concrete blocks. A pebble rock bed covers the coarse rock bed.

Figure 1:
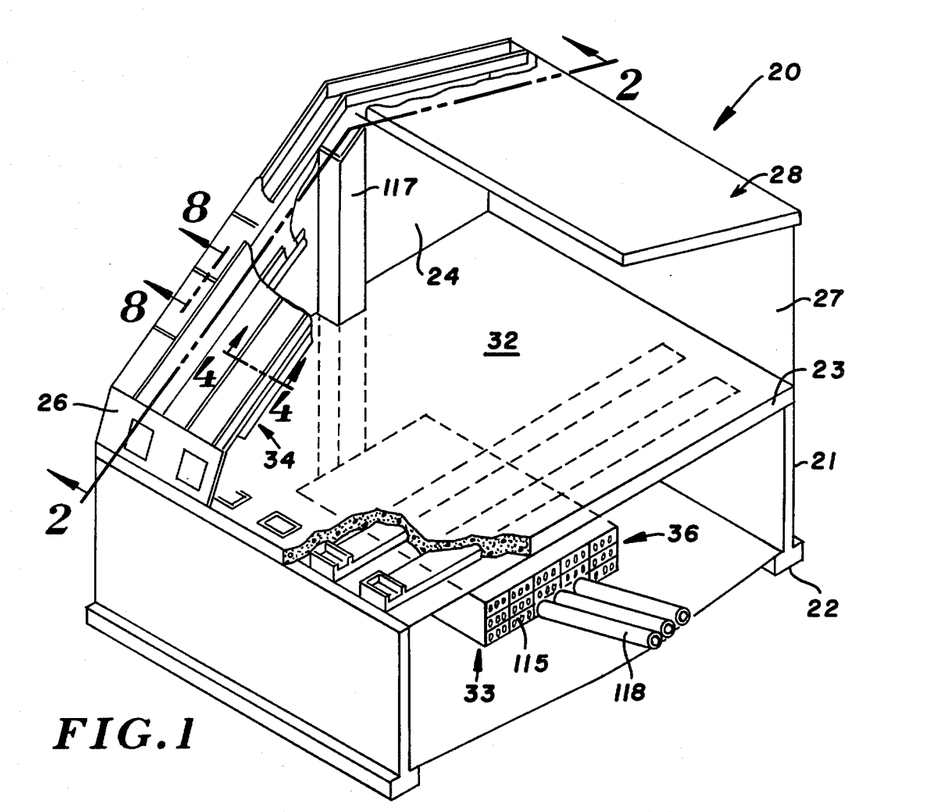
FIG. 1 is a perspective view, partly sectioned, of a structure equipped with the solar heating system of the invention.
Figure 2:
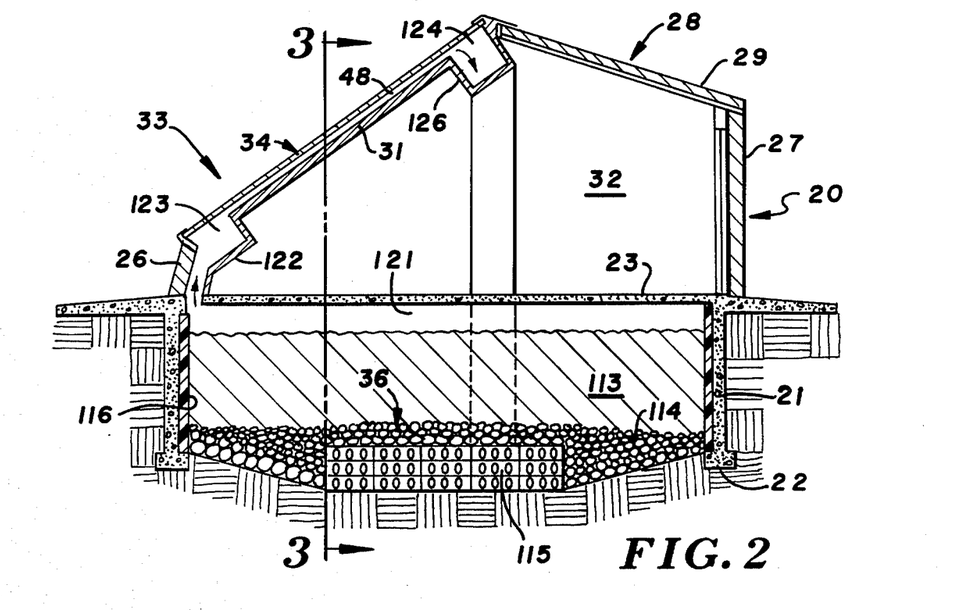
FIG. 2 is a sectional view taken along line 2—2 of FIG. 1.
Figure 3:
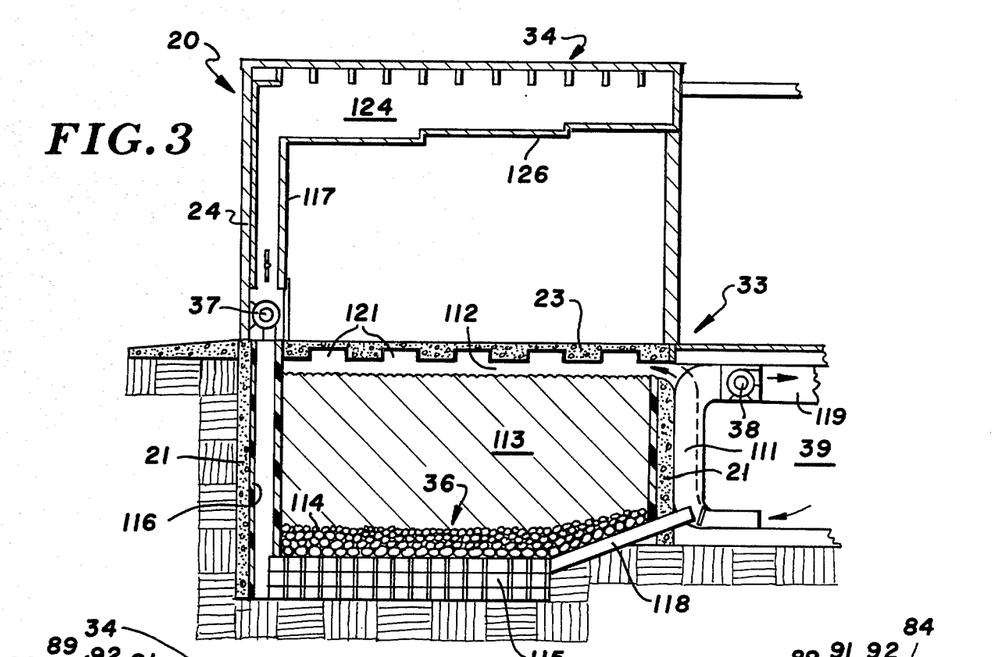
FIG. 3 is a sectional view taken along line 3—3 of FIG. 2.

DESCRIPTION OF PREFERRED EMBODIMENTS:

Referring to FIGS. 1-3, there is shown a structure indicated generally at 10, as a home, garage, greenhouse, office, or an industrial building. These uses of structure 20 are examples which are not intended to limit the utility of the structure. Structure 20 has upright foundation walls 21 supported on footings 22 located below ground level. A generally horizontal floor 23 extends between walls 21 and is supported thereon. Floor 23 can be a concrete floor or made from conventional wood. Side walls 24, front wall 26, and rear wall 27 extend upwardly from the outer peripheral edges of floor 23 and support a roof indicated generally at 28. Roof 28 has a first sloping portion 29 covered with the conventional roof boards and shingles. Roof 28 is completed with a second longer inclined portion 31 that is joined to front wall 26. Walls 24, 26, and 27 and roof 28 enclose a space or room 32. Wall 27 can have doors to facilitate the movement of objects into and out of room 32.

Structure 20 is equipped with a solar heating system of the invention indicated generally at 33. System 33 includes a solar collector assembly indicated generally at 34 mounted on second portion 31 to roof 28 and a heat storage means indicated generally at 36 located below floor 23. As shown in FIG. 3, a first air pump or blower 37 operates to move air through collector assembly 34 and to heat storage means 36. A second blower 38 is operable to move air from heat storage means 36 to a selected environment or space 39, such as a room, or the conventional heating air distribution system of a home.

Figure 4:
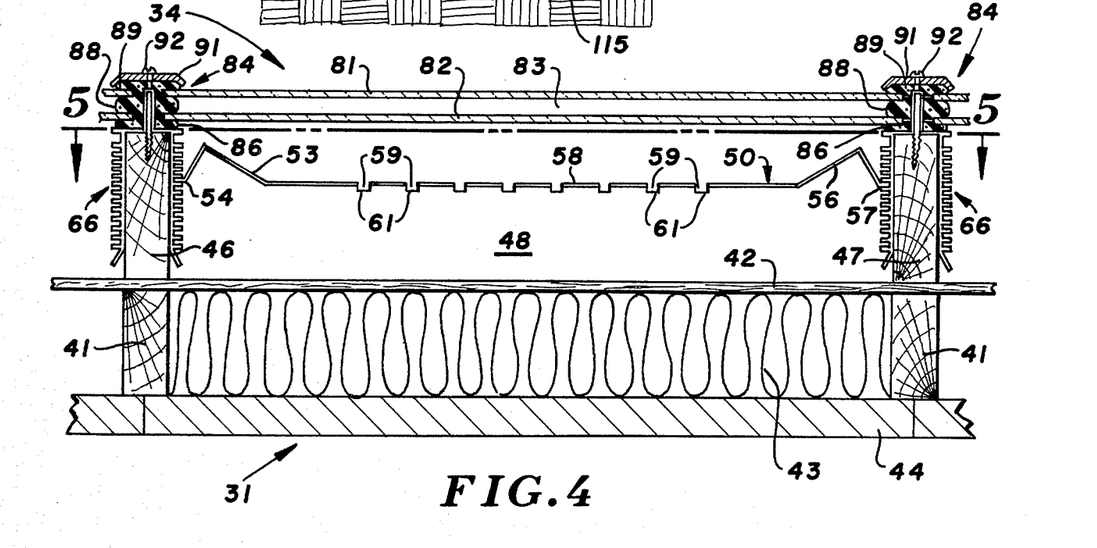
FIG. 4 is an enlarged sectional view taken along line 4—4 of FIG. 1.

Referring to FIG. 4, roof portion 31 has laterally spaced roof rafters 41 supporting roof boards or panels 42. Insulation 43, as mineral wool, or fiberglass blankets or batts, is located between adjacent rafters 41. Inside panels, as wall board or rigid insulation 44, are attached to roof rafters 41 to enclose insulation 43 between roof boards 42 and panel 44.

Solar collector assembly 34 is mounted on roof boards 42. Assembly 34 has a plurality of upright frames or super structures 46 and 47 providing upright elongated passages or spaces 48 to allow the movement of air from the bottom of the collector assembly to the top of the collector assembly. Frames 46 and 47 are 2×4 or 2×6 wood beams fastened to roof boards 42 and roof rafters 41. Suitable conventional fasteners (not shown), as screws, nails, adhesives, and the like, are used to attach frames 46 and 47 to roof boards 42.

Figures 5, 6, 7, 8, 9, 10:
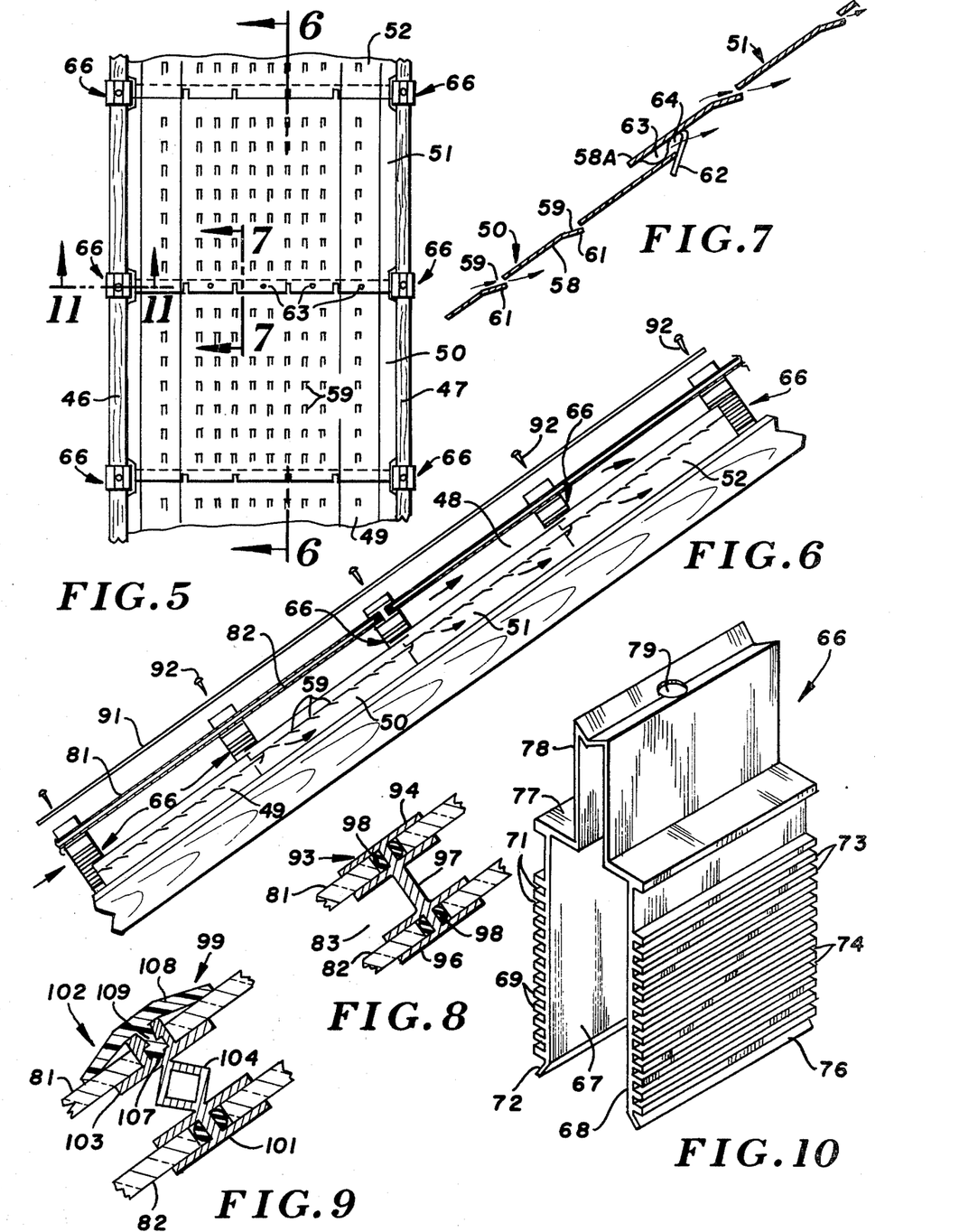
FIG. 5 is a sectional view, on a reduced scale, taken along line 5—5 of FIG. 4.
FIG. 6 is an enlarged sectional view taken along line 6—6 of FIG. 5.
FIG. 7 is an enlarged sectional view taken along line 7—7 of FIG. 5.
FIG. 8 is an enlarged sectional view taken along line 8—8 of FIG. 1.
FIG. 9 is a sectional view similar to FIG. 8 of a modified glass connector.
FIG. 10 is a perspective view of the collector plate holder.

As shown in FIGS. 5, 6, and 7, a plurality of end-to-end solar energy absorption panels 49, 50, 51, and 52 are located in air passage 48 between frames 46 and 47. The number of panels can vary according to the length of frames 46 and 47. Panels 49–52 are positioned in ascending elevation from the inlet end of passage 48. Adjacent panels are in stepped relationship with each other.

Figure 17:
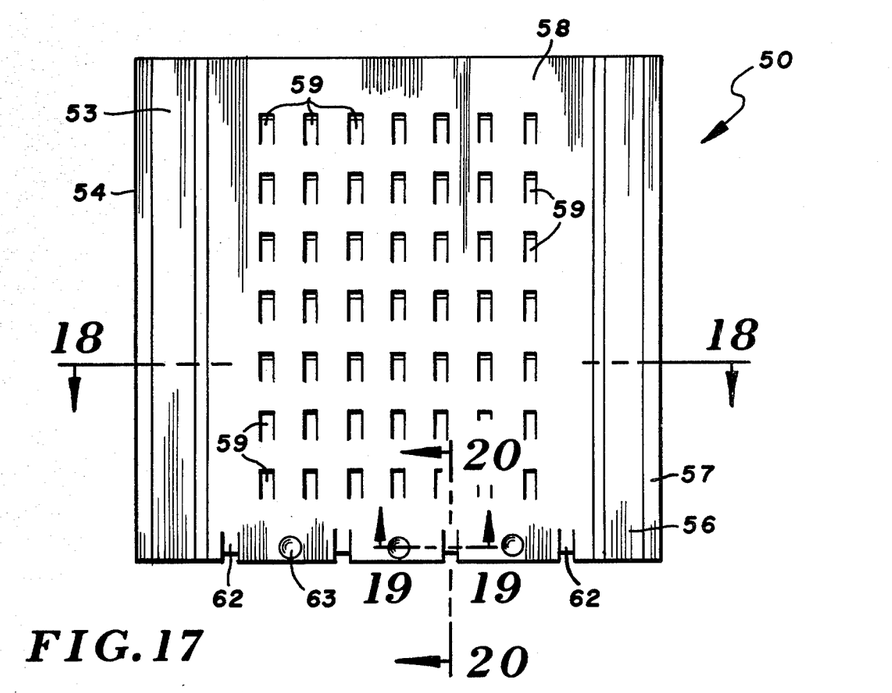
FIG. 17 is a top plan view of a solar energy absorption panel.
Figure 18:
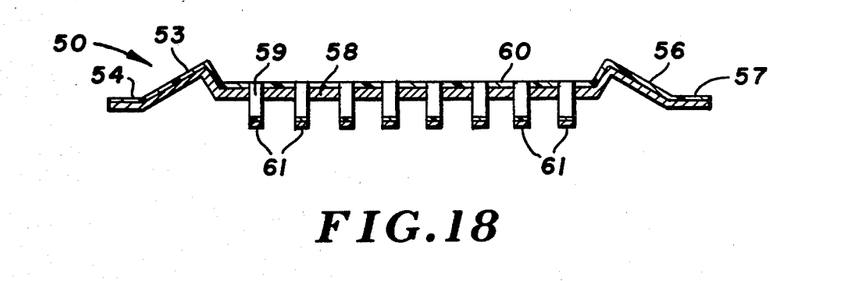
FIG. 18 is a sectional view taken along the line 18—18 of FIG. 17.
Figure 19:
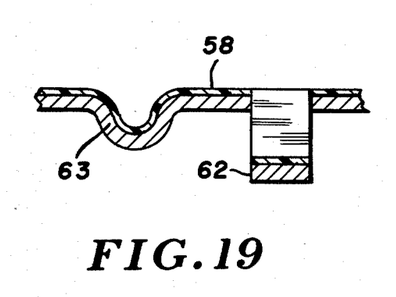
FIG. 19 is an enlarged sectional view taken along the line 19—19 of FIG. 17.
Figure 20:
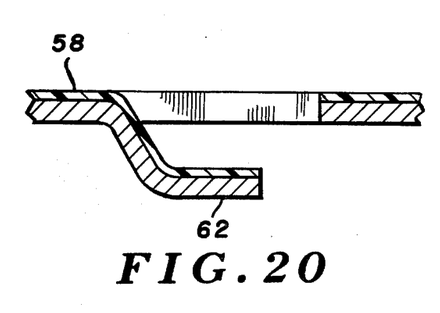
FIG. 20 is an enlarged sectional view taken along line 20—20 of FIG. 17.

Panels 49–52 are identical in structure. Referring to FIGS. 17 and 18, panel 50 has a first side flange 53 having a generally right angle shape terminating in an outwardly directed foot or lip 54. The opposite side of panel 50 has a second right angle flange 56 terminating in an outwardly directed foot or lip 57. Lips 54 and 57 extend the full length of flanges 53 and 56. Flanges 53 and 56 are integral with a generally flat body or sheet member 58. Body 58 has a plurality of openings or rectangular holes 59 arranged in a rectangular coordinated pattern as shown in FIGS. 5 and 17. The top side of body 58 and flanges 53 and 56 are coated with a black material 60, as paint, plastic, and the like, to enhance solar energy absorption. Downwardly directed tabs or ears 61 secured to body 58 form one edge of openings 59. Ears 61 are formed by stamping generally rectangular portions of body 58 to form openings 59. A U-shaped cut is made in the body for each opening 59. The tab 61 for each opening 59 extends downwardly and forwardly from the leading or inlet end of the opening. The air moving through passage 48 flows through the openings 59. Openings 59 can have other shapes, as oval, circular, triangle and the like.

Returning to FIG. 7, absorption panel 50 is located in end-to-end relation relative to absorption panel 51. The lower edge of panel 51 has a downwardly and inwardly directed ear or tab 62 forming a pocket 64 for the upper edge of panel 50. Downwardly directed depressions or dimples 63 located between ears 62 space the body 58A a short distance above the body 58 of panel 50. This permits a small amount of air to flow between panels 50 and 51. All of the air flowing through passage 48 flows from the space above the panels to the space below the panels. The air transpires through openings 59 in the panels and through the transverse space between adjacent ends of the panels.

Referring to FIG. 10, there is shown a holder indicated generally at 66 for positioning absorption panels 49–52 at selected elevations between frames 46 and 47. Holder 66 has a pair of upright side walls or members 67 and 68. Wall 67 has a plurality of horizontal outwardly directed ribs 69 forming vertically separated horizontal grooves 71. Ribs 69 extend from a bottom outwardly directed lip 72 to adjacent the top of wall 67. Wall 68 has a plurality of horizontal ribs 73 defining vertically separated horizontal grooves 74. The bottom of wall 68 has an outwardly directed lip 76. Lips 72 and 76 facilitate the placement of holder 66 on frames 46 and 47 as shown in FIG. 4. Holder 66 fits over a frame to locate the frame in the space between walls 67 and 68. The upper ends of walls 67 and 68 are joined with a top or outwardly directed shoulder 77 and a generally inverted U-shaped head 78. The center of the head 78 has a hole 79. Holder 66 can be an extruded metal member, such as an extruded aluminum, plastic, wood or other structural materials.

As shown in FIGS. 4, 8, 11, and 13, air passage 48 is covered with transparent sheet members 81 and 82. Sheet members 81 and 82 can be glass, plastic, or like transparent sheet materials. Members 81 and 82 are spaced from each other and enclosed on air space 83. A seal assembly indicated generally at 84 maintains the space relationship between members 81 and 82. Seal assembly is also used to mount members 81 and 82 on the holders 66 and frames 46 and 47.

Figure 11:
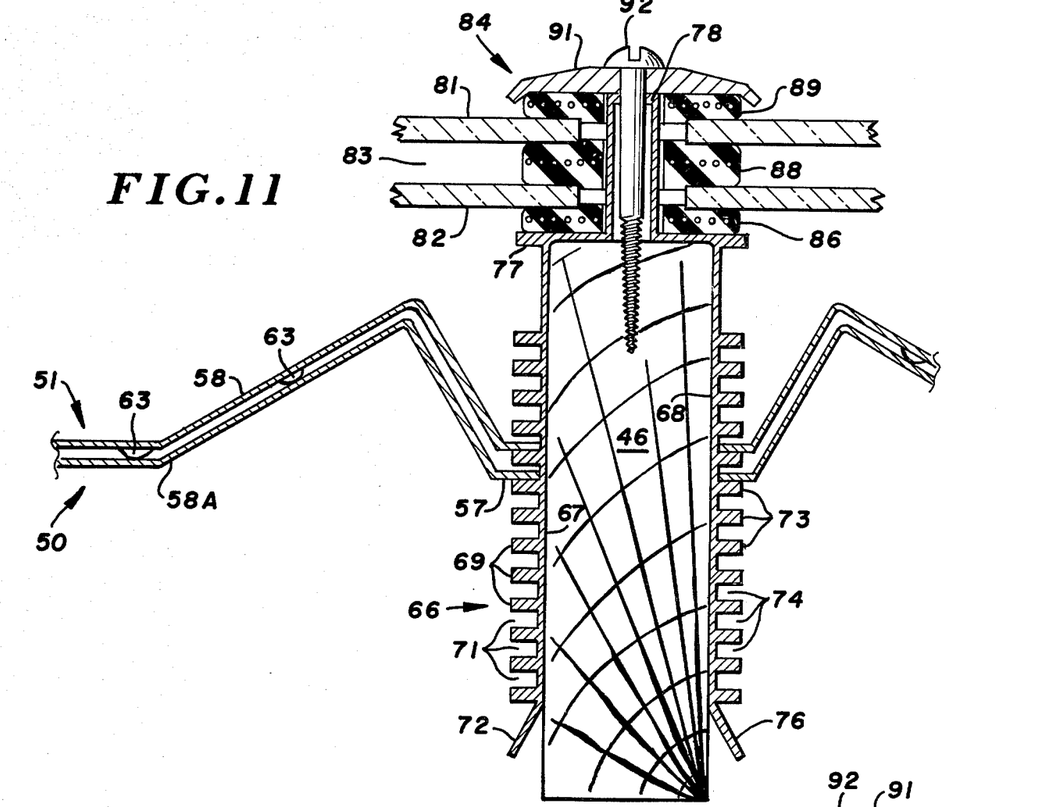
FIG. 11 is an enlarged sectional view taken along line 11—11 of FIG. 5.
Figure 12:
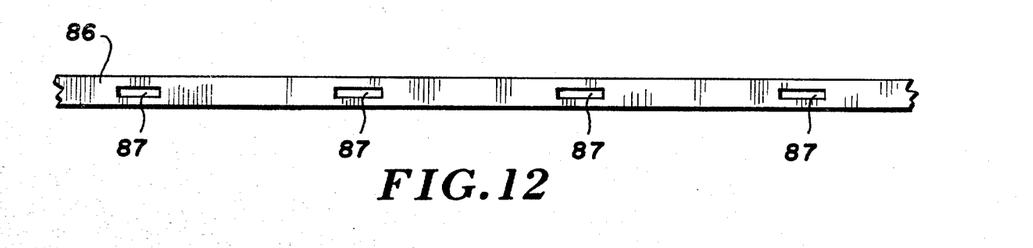
FIG. 12 is a plan view of the longitudinal seal strip.
Figure 13:
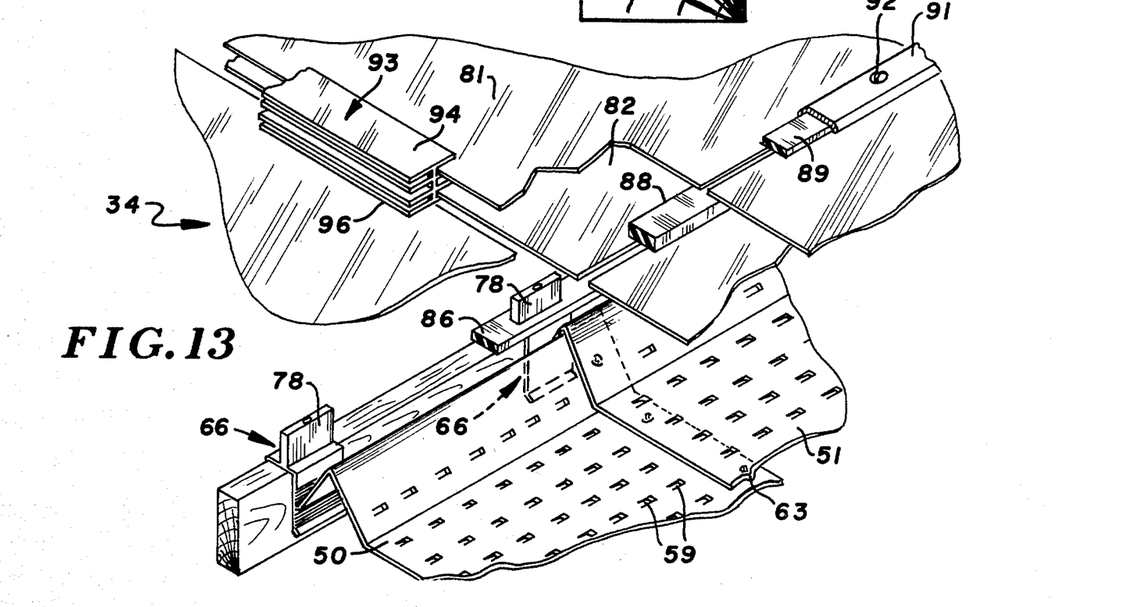
FIG. 13 is a fragmentary perspective view of the collector assembly.

As shown in FIG. 11, seal assembly 84 has a base strip 86 that extends longitudinally along the top of frame 46. Base strip 86, as shown in FIG. 12, has a plurality of longitudinally spaced rectangular slots to accommodate the heads 78 of holders 66. Base strip 86 also serves as a spacer for holders 66. The seal assembly 84 includes a middle strip 88 and a top strip 89. The inside sheet member 82 is located between strips 86 and 88. The outside sheet member 81 is located between the strips 88 and 89. Sealing strips 86, 88, and 89 are identical in structure, each having longitudinal rectangular slots to accommodate the heads 78 of the holders 66. Strips 86, 88, and 89 are elastic members having longitudinal fabric reinforcing cords. A longitudinal strip or cover 91 serves to clamp the seal strips 86, 88, and 89 together. Cover 91 has a hole to accommodate a fastener 92, as a screw. Fastener 92 extends through hole 79 in head 78 and is turned into frame 46. Other types of fasteners can be used to attach cover 91 to frame 46.

As shown in FIG. 8, the transverse adjacent edges of the sheet members 81 and 82 are connected together with a lateral connector indicated generally at 93. Lateral connector 93 is a double H-shaped member having a first H-shaped structure 94 and a second H-shaped structure 96. A transverse web 97 connects the H-shaped structure 94 and 96. The adjacent edges of the sheet members 81 and 82 fit into the channels formed by the H-shaped structures 94 and 96. A sealant 98 is located in the base of the channels and serves as an expansion structure for the sheet members 81 and 82, as well as a seal holding the sheet members 81 and 82 on connector 93. p Referring to FIG. 9, there is shown a modification of the lateral connector indicated generally at 99. Connector 99 has a first generally H-shaped structure 101 and a two-piece second H-shaped structure 102. Structure 102 has an inner part 103 joined to the first H-shaped structure with a web 104. Web 104 has a generally square cross section with the opposite corners of the web attached to the H-shaped structure 101 and the inner part 102. Part 102 has an upwardly extended transverse body formed with an undercut slot 107. The second H-shaped member has a second T-shaped part 108 having an inwardly directed locking rib 109. Rib 109 is forced into the undercut 107 so that its enlarged head fits into the enlarged or undercut portion of the slot, thereby locking the second or outer part 108 on the body 106. The sheet members 81 and 82 are clamped between the inner part 103 and the outer part 102. The outer part 102 can be removed from the body 106 to facilitate the replacement of sheet member 81.

As shown in FIG. 3, return air from the room 39 moves up the inlet duct or return air duct 111 to the space 112 above the heat storage means 36. The heat storage means 36 is a porous rock bed located between underground walls 21 of the structure. The rock bed comprises a gravel or medium sized rock or pebble layer 113, a coarse or larger rock layer 114, and a core of concrete or cinder blocks 115. Each block 115 has a plurality of openings. The blocks 115 are arranged side-by-side with the openings aligned with each other so that the core of blocks has a plurality of air passages for accommodating the hot air from the collector assembly. The entire heat storage means 36 is surrounded with insulating sheet material 116, as shown in FIGS. 2 and 3.

The hot air from panels 49-52 is carried downwardly through inlet duct 117 into the air passages of the concrete blocks 115. Blower 37 functions to move the air through the duct 117 and into one end of the heat storage blocks 115. The air moves through the blocks and into the rock bed 114 and pebble bed 113. This raises the heat energy of the bed. When the consuming structure needs heat, air is carried via the pipes 118 to the ducts of the heating system. The blower 38 is used to move the air through the pipes 118 to the duct 119. The pipes 118, as shown in FIGS. 1 and 3, lead from one end of the concrete blocks 115 to the lower end of the duct 119.

The floor 23 has a plurality of longitudinal passages 121 which lead to an inlet housing 122 adjacent the inside of wall 126. Housing 122 forms an inlet chamber or manifold 123. The chamber 123 is open to the lower or inlet end of the air passage 48 containing panels 49-52. The upper or outlet end of the air passage 48 is open to a collection or outlet chamber 124 formed by a manifold housing or casing 126. Housing 126 is open to the inlet end of the duct 117.

Figures 14, 16:
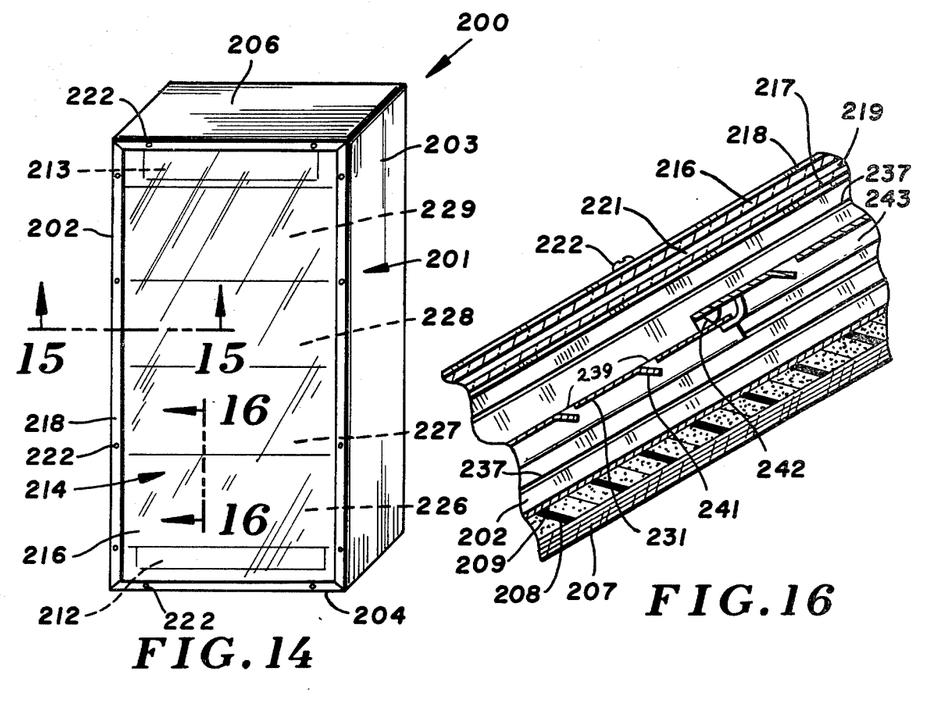
FIG. 14 is a perspective view of a modified solar energy collector of the invention.
FIG. 16 is a sectional view taken along the line 16—16 of FIG. 14.
Figure 15:
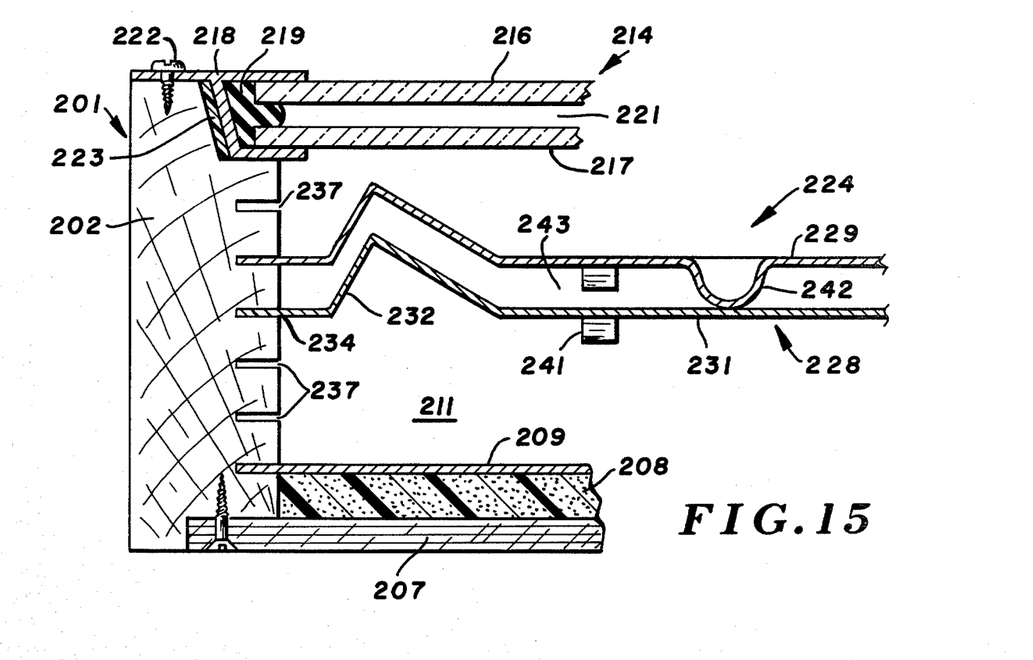
FIG. 15 is an enlarged sectional view taken along the line 15—15 of FIG. 14.

Referring to FIGS. 14 and 15, there is shown a modification of the collector assembly of the invention indicated generally at 200. Collector assembly 200 has a box type frame 201. Frame 201 has an elongated generally rectangular shape form including longitudinally extended side members 202 and 203. The side members 202 and 203 can be elongated beams, such as 2×4 and 2×6 wood members. A transverse inlet end member 204 is attached to the inlet ends of side members 202 and 203. In a similar manner, an outlet end member 206 is attached to the opposite ends of side members 202 and 203. As shown in FIG. 14, a generally flat bottom wall or panel 207 is secured to the side members 202 and 203. A sheet of insulation material 208 covers the inside of the bottom panel 207. A protective sheet member 209 extends over the top of insulation material 208.

Frame 201 defines an elongated air passage 211 that extends the length of the collector assembly. Bottom panel 207 has an inlet opening 212 adjacent the end wall 204 and an outlet opening 213 adjacent the end wall 206. The openings 212 and 213 are in communication with suitable manifolding and duct work, which carries the air to the heat storage structures of the solar energy system.

A transparent cover means indicated generally at 214 is mounted on the frame 201 and closes the top of air passage 211. Transparent cover means 214 has a pair of glass panes 216 and 217 that allow the solar light energy into air passage 211. A frame 218 surrounds the outer edges of the glass panes 216 and 217. A seal 219 located in the frame 218 engages the outer edges of the glass panes 216 and 217 and holds the panes in a side-by-side spaced relationship so that there is a dead air space 221 between the panes. A fastener 222, as a screw, is used to attach frame 218 to the frame 202. Other types of connecting structures can be used to mount the frame 218 on the side and end members. As shown in FIG. 15, frame 218 has a generally channel shaped cross section. A portion of frame 218 is located in a groove or recess in the inside of side member 202. A strip 223 of insulation is located in the recess adjacent frame 218.

A solar absorption panel assembly indicated generally at 224 is located in the air passage 211 under the transparent means 214. The solar energy absorption panel assembly 224 comprises a series of end-to-end sheet members or panels 226, 227, 228, and 229. As shown in FIG. 15, the panels are arranged in a stepped ascending order from the inlet end 204 to the outlet end 206.

The panels 224-229 are identical in structure. The following detailed description is limited to panel 226. Panel 226 has longitudinally extended side flanges 232 and 233. The side flanges have an angular configuration and cross section, whereby they extend upwardly along the sides of a generally flat body or sheet member 231. Side flange 232 has an outwardly directed linear edge 234. Side flange 233 also has an outwardly directed edge or foot 236. The side members 202 and 203 have a series of inwardly opened slits or grooves 237 and 238 accommodating the edges 234 and 236, respectively. The grooves 237 and 238 are at spaced elevations along the inside of the side members 202 and 203 and are used to locate the panels 226-229 at selected planes so that the panels have a stepped arrangement in the air passage 211.

Panel 226 has a plurality of openings 239. A short downwardly and forwardly directed tab 241 is located below the openings. Tabs 241 are formed by punching three sides of the openings from the metal whereby the metal portion of the opening forms the tabs. Spacer structures 242 are located along the forward or leading edges of the panels. As shown in FIG. 15, spacer structures 242 are downwardly directed dimples that space adjacent ends of the panels from each other so that there is a narrow linear opening or mouth 243 between the adjacent panels. Opening 243 is relatively small so that the majority of the air flows through openings 239.

In use, air from a source, such as an internal closed space or external air is moved through the entrance opening 212 into the forward end of the passage 211. The air moves through passage 211 along the panels 226-229. The air flows through the passages or openings 241 and the space 243 between panels as the solar energy is absorbed by the panels 226-229 and is transferred in the form of heat to the moving air. The heated air is moved from the air passage 211 through the outlet opening 213 to a heat storage area or sink or an environment to be heated.

Collector assembly 200 can be a module unit having a plurality of passages extended between an inlet opening and an outlet opening. End-to-end solar energy absorption panels as disclosed in FIGS. 17 to 20 are located in each passage.

While there has been shown and described the preferred embodiments of the solar heating system and solar energy absorption panel, it is understood that changes in the materials, design, structures, sizes and shapes, may be made by those skilled in the art without departing from the invention.

The embodiments of the invention in which an exclusive property or privilege is claimed are defined as follows:

1. An apparatus for collecting solar energy comprising: frame means having an air passage, an inlet for directing air into the passage, and an outlet for carrying air from the passage, said frames including elongated laterally spaced members providing an elongated air passage between adjacent members, said inlet located at one end of the air passage, and said outlet located at the other end of the air passage, transparent means mounted on the frame means to cover the passage, solar energy absorption means located in the air passage for heating the air in the passage, said solar energy absorption means including a plurality or sheet members extended across the air passage, and along the length of the air passage, said sheet members arranged in an ascending stepped relationship from adjacent the inlet to adjacent the outlet, each sheet member having outwardly directed side flanges adjacent sheet members having ends spaced from each other to allow limited flow of air between said adjacent ends, means on at least one of said ends of each adjacent sheet member to space said ends from each other, means on the parallel spaced members engageable with the side flanges supporting the sheet members end-to-end on the frame means in different substantially parallel planes to locate adjacent sheet members in said ascending stepped relation relative to each other, said means on the parallel spaced members comprising a plurality of holders mounted on the members, each holder having side walls with spaced ribs forming grooves to accommodate the flanges of the sheet members, each sheet member having a plurality of openings allowing air to flow through the sheet members as the air moves through the passage from the inlet to the outlet.

2. The apparatus of claim 1 wherein: each side flange has an angular shape in cross section.

3. The apparatus of claim 1 wherein: each sheet member has downwardly and forwardly directed tabs located below the openings in the sheet member.

4. The apparatus of claim 1 wherein: each sheet member has an end section with spacer means engageable with an adjacent sheet member to hold the adjacent sheet members spaced from each other.

5. The apparatus of claim 4 wherein; one end section of each sheet member has downwardly directed tabs that engage an adjacent end section of a sheet member.

6. The apparatus of claim 1 wherein: at least one side flange has an angular shape in cross section.

7. An apparatus for collecting solar energy comprising: a pair of elongated frames, said frames being laterally spaced from each other to define an elongated air passage, an air inlet at one end of the passage, the opposite end of said passage having an air outlet, transparent means mounted on the frames to cover the top of the air passage, solar energy absorption panels located in the air passage between the frames, said panels comprising at least a pair of end-to-end sheet members, each sheet member having a plurality of openings, and means on the frames for supporting the sheet members at different elevations whereby the sheet members are located in stepped relationship relative to each other, whereby air flowing through the air passage flows through and between adjacent sheet members so that heat absorbed by the sheet members from solar energy is transferred to the air, each sheet member having outwardly directed side flanges, means on the frames engageable with the side flanges to hold the sheet members in selected positions relative to the frames, said means on the frames comprising a plurality of holders mounted on the frames, each holder having side members with spaced ribs forming grooves to accommodate the flanges of the sheet members.

8. The apparatus of claim 7 wherein: each sheet member having a body with first and second sides and a plurality of openings, tabs secured to the body adjacent each opening, one side flange being secured to the first side of the body and the other side flange being secured to the second side of the body.

9. The apparatus of claim 8 wherein: said body and side flanges being a single sheet member, said flanges having an angular cross section.

10. The apparatus of claim 7 wherein: each flange of the sheet member has an angular shape and cross section.

11. The apparatus of claim 7 wherein: each sheet member has downwardly and forwardly directed tabs extended below the openings in the sheet members.

12. The apparatus of claim 7 wherein: each sheet member has an end section with spacer means engageable with an adjacent sheet member to hold the adjacent sheet members at different elevations.

13. The apparatus of claim 12 wherein: the spacer means are downwardly directed portions of the sheet members.

14. The apparatus of claim 7 wherein: each sheet member has an end section with downwardly directed tabs that engage adjacent end sections of a sheet member to hold the sheet members in substantially end-to-end positions.

15. An apparatus for collecting solar energy comprising: a pair of elongated frames, said frames being laterally spaced from each other to define an elongated air passage, an air inlet at one end of the passage, the opposite end of said passage having an air outlet, transparent means mounted on the frames to cover the top of the air passage, solar energy absorption panels located in the air passage between the frames, said panels comprising at least a pair of end-to-end sheet members, each sheet member having a plurality of openings and outwardly directed side flanges, said pair of sheet members being arranged in an ascending stepped relationship from the inlet to the outlet, adjacent sheet members having ends spaced from each other to allow a limited flow of air between said adjacent ends, means on at least one of said ends of adjacent sheet members to space said ends from each other, and means on the frames for supporting the sheet members in said ascending stepped relationship on the frames, said side flanges of each sheet member cooperating with the means on the frames to support the sheet members on the frames whereby air flowing through said air passage flows through and between adjacent sheet members so that heat absorbed by the sheet members from solar energy is transferred to the air.

16. The structure of claim 15 wherein: each sheet member has a body having an end section, said end section having spacer means engageable with a portion of an adjacent sheet member and a plurality of ears adapted to engage said adjacent sheet member to locate said sheet member in an end-to-end relationship with an adjacent sheet member.

17. The apparatus of claim 15 wherein: each sheet member has a generally flat body, said plurality of openings being located in said body, tabs secured to the body adjacent the openings, and side flanges comprising a first side flange secured to one side of the body and a second side flange secured to the second side of the body.

18. The apparatus of claim 11 wherein: the openings in the body have a rectangular shape and are arranged in a rectangular coordinated pattern.

19. The apparatus of claim 17 wherein: the body and first and second side flanges are a single sheet member, said side flanges having an angular cross section.

20. The apparatus of claim 19 including: a lip extended outwardly from side flanges.

21. The apparatus of claim 10 wherein: each lip extends the full length of its associated side flange.

22. The apparatus of claim 17 wherein: the tabs are located below the openings in the body.

23. An apparatus for collecting solar energy comprising: a pair of elongated frames, said frames being laterally spaced from each other to define an elongated air passage, an inlet at one end of the passage, the opposite end of the passage having an air outlet, light transparent means mounted on the frames to cover the top of the air passage, solar energy absorption panels located in the air passage between the frames, said panels comprising at least a pair of end-to-end sheet members, each sheet member having a plurality of openings, said pair of sheet members being arranged in an ascending stepped relationship from the inlet to the outlet, adjacent sheet members having ends spaced from each other to allow a limited flow of air between adjacent ends, means on at least one of said ends of adjacent sheet members to space said ends from each other, and means on the frame comprising a plurality of spaced ribs forming grooves to accommodate portions of the sheet members for supporting the sheet members in said ascending stepped relationship on the frames whereby air flowing through said air passage flows through and between adjacent sheet members so that heat absorbed by the sheet members from solar energy is transferred to the air.

24. The apparatus of claim 23 wherein: each sheet member has outwardly directed side flanges, said side flanges extended into the grooves and cooperating with the ribs for supporting the sheet members on said frames.

25. The apparatus of claim 24 wherein: at least one of said side flanges has an angular shape in cross section.

26. The apparatus of claim 23 wherein: each sheet member has a body having an end section, said end section having spacer means engaging with a portion of an adjacent sheet member and a plurality of ears adapted to engage said adjacent sheet member to locate said sheet member in an end-to-end relationship with an adjacent sheet member.

27. The sheet member of claim 23 wherein: each sheet member has at least one side flange having an angular shape in cross section cooperating with the ribs to support the sheet member on the ribs.

28. The apparatus of claim 23 wherein: said means on at least one of said ends of adjacent sheet members includes a plurality of ears adapted to engage another sheet member.

29. The apparatus of claim 23 wherein: the means on at least one of said ends of adjacent sheet members includes spacer means comprising downwardly directed portions of the body.

* * * * *

UNITED STATES PATENT AND TRADEMARK OFFICE
CERTIFICATE OF CORRECTION

PATENT NO. : 4,207,868
DATED : June 17, 1980
INVENTOR(S) : Roger A. Peterson

It is certified that error appears in the above-identified patent and that said Letters Patent are hereby corrected as shown below:

Title page, Column 2, line 18, "National Hardware" should be -- Solar Hardware --.

Column 4, line 36, delete "p" before "Referring".

Column 6, line 67, "or" should be -- of --.

Column 8, line 59, "11" should be -- 17 --.

Column 8, line 67, "10" should be -- 20 --.

Signed and Sealed this

Nineteenth Day of August 1980

[SEAL]

Attest:

SIDNEY A. DIAMOND

Attesting Officer

Commissioner of Patents and Trademarks